United States Patent [19]
Wang

[11] Patent Number: 6,031,618
[45] Date of Patent: Feb. 29, 2000

[54] APPARATUS AND METHOD FOR ATTRIBUTE IDENTIFICATION IN COLOR REPRODUCTION DEVICES

[75] Inventor: Shen-ge Wang, Fairport, N.Y.

[73] Assignee: Xerox Corporation, Stamford, Conn.

[21] Appl. No.: 09/047,453

[22] Filed: Mar. 25, 1998

[51] Int. Cl.[7] .................................................. G01N 21/25
[52] U.S. Cl. ........................................................ 356/419
[58] Field of Search .................................... 356/416, 418, 356/402–411, 419; 250/226, 208.1–208.6; 348/272, 276, 342, 254, 273, 33; 358/514, 505, 504, 512, 501, 518, 305; 382/162–167; 355/88

[56] References Cited

U.S. PATENT DOCUMENTS 5,642,197  6/1997  Tuhro et al. .

OTHER PUBLICATIONS

How to Turn Your Scanner Into a Colorimeter, IS&T's Tenth International Congress on Advances in Non–Impact Printing Technologies (1994), pp. 579–581.

Optimal Nonnegative Color Scanning Filters, IEEE Transactions on Image Processing, vol. 7, No. 1, Jan. 1998, pp. 129–133.

Borgaard et al "Optimal . . . Spectral " Annerical Chemical Society 1992.

*Primary Examiner*—K P Hantis
*Attorney, Agent, or Firm*—Oliff & Berridge, PLC

[57] ABSTRACT

An apparatus and method identify at least one attribute of an article for use in accurately reproducing the article. The apparatus includes at least one detector having an array of cells. At least one cell, in the detector array, the sensor cell, is provided with an extra colored coating or is painted with an extra color. When the article is scanned by the detector, the at least one sensor cell will read a different color value from the other cells due to the extra coating applied to it. The color that the at least one sensor cell would have output without the extra coating is interpolated from the detection results of the neighboring cells. This color and the color actually detected by the at least one sensor cell are then input to a controller which determines the at least one attribute of the scanned article using a model, such as a neural network, an expert system, a fuzzy logic model, and the like. The controller performs appropriate processing based on the at least one determined attribute.

25 Claims, 6 Drawing Sheets

APPARATUS AND METHOD FOR ATTRIBUTE IDENTIFICATION IN COLOR REPRODUCTION DEVICES

BACKGROUND OF THE INVENTION

1. Field of Invention

The invention is directed to an apparatus and method for attribute identification. More specifically, the invention is directed to an apparatus and method which identifies at least one attribute of an article so that the article may be accurately reproduced.

2. Description of Related Art

Color detection in reproduction devices, such as color scanners and photocopiers, is generally known in the art. As illustrated in FIG. 1, a conventional color scanner includes a light source 100 which illuminates an image on a medium 110. The light beam 102 that is incident upon the image is reflected and imaged by an optical system 104 down upon a CCD sensor 120. These conventional scanners use many different methods and apparatus to detect the colors of the image.

For color scanners to properly convert the color image to electronic signals, the color scanners need to simulate the color response of the human eye. This is conventionally done by scanning the color image with the three separate color channels, usually red, green and blue channels.

As shown in FIG. 2, the CCD sensor 120 of the conventional color scanner has three rows 122, 124 and 126 of detectors over which three different color filters, a red filter R, a green filter G, and a blue filter B, are placed. Thus, the color scanner has separate areas of the sensor for sensing particular color components of the image being scanned.

Another approach taken by the prior art is shown in FIG. 3. In this device, the CCD sensor 120 does not have any color filters on the rows 122, 124 and 126 of the detectors. Instead, a color wheel 130 is placed in the optical path of the light beam 102 between the light source 100 and the CCD sensor 120. The color wheel 130 contains three filters, a red filter 132, green filter 134 and blue filter 136. The color wheel 130 is rotated through the optical path to provide the proper color separation. This device requires three scans of the image in order to obtain information on all three colors.

In another approach, as shown in FIG. 4, a conventional color scanner uses three filters, a red filter 142, green filter 144 and blue filter 146. These filters are moved into and out of the optical path of the light beam 102 between the light source 100 and the CCD sensor 120. By sliding the filters 142, 144 and 146 into and out of the optical path, information for each color of the image can be obtain in three scans of the image.

However, since the color filters of conventional scanners do not exactly match the spectral response of the human eye, only an imperfect conversion from the scanner output to a colormetric response (human eye) can be obtained. For accurate color representation, it is necessary to have a color scanner with a color response that matches the human eye. If a color scanner can accurately match the color response of the human eye, the color scanner can create an electronic file that completely describes the color of an object as seen by the human eye. Thus, the image can be reproduced accurately by a printer, a photocopier, or a display.

Recently, an approach has been suggested in U.S. Pat. No. 5,642,197 to Tuhro et al., which is shown in FIG. 5. Tuhro suggests using a filter 150 in addition to the red, green and blue filters 132–136 of the color wheel 130 to obtain corrected color values. Specifically, Tuhro's approach requires an initial scan of the image using a set of red, green and blue filters, and then subsequent scans using the red, green and blue filters with the additional filter 150 placed in the optical path. The additional filter 150 provides offset color values that may be used to calculate corrected color values. In another embodiment of Tuhro, shown in FIG. 6, the color wheel 130 is equipped with an additional red filter 133, an additional green filter 135 and an additional blue filter 137 to provide the offset values. This approach requires many additional scans of the image, for example up to six scans of the image, thus slowing down the reproduction process.

SUMMARY OF THE INVENTION

Thus, it would be beneficial to have a device that can accurately match the spectral response of the human eye without requiring additional scans of the image.

To this end, it has been determined that, if certain attributes of the scanned article can be detected, appropriate processing can be performed to accurately reproduce the scanned article. For example, if the medium of the scanned article can be determined, appropriate color correction can be applied to the scanned color data performed to reproduce the article in true color, i.e., the colors perceived by the human eye.

This invention provides an apparatus and method that determines at least one attribute of an article based on the colors detected using either a modified detector or an additional detector during scanning of the article. Once the at least one attribute is determined, various processing may be performed based on the at least one attribute in order to accurately reproduce the scanned article.

In a preferred embodiment, the at least one attribute is the medium of the scanned article. By determining the medium of the scanned article, the true colors of the article may be determined using appropriate correction values obtained through calculation, a lookup table, or the like.

The apparatus includes at least one detector having an array of cells. One cell in the detector array is provided with an extra colored coating or is painted with an extra color. The coated or painted cell is the sensor cell.

When the article is scanned by the detector, the sensor cell will read a different color value from the other cells due to the extra coating applied to it. The color that the sensor cell would have output without the extra coating is interpolated from the outputs of the cells neighboring the sensor cell. This color and the color actually detected by the sensor cell are then input to a controller which determines at least one attribute of the scanned article, such as the medium of the article, the device that formed the article, and the like. From this attribute, in one embodiment, the controller determines the appropriate correction for the color values detected by the other cells so that accurate reproduction of the article can be performed.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
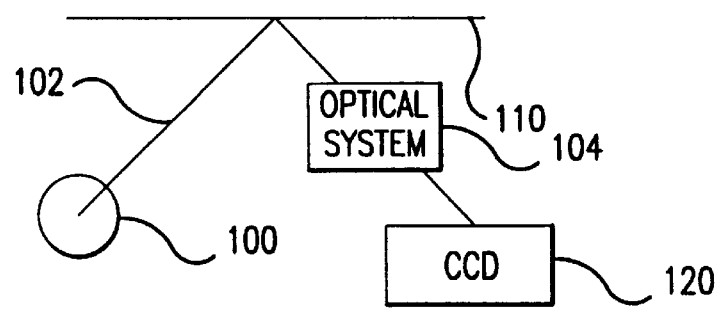
FIG. 1 is a block diagram of a conventional color scanner.
Figure 2:
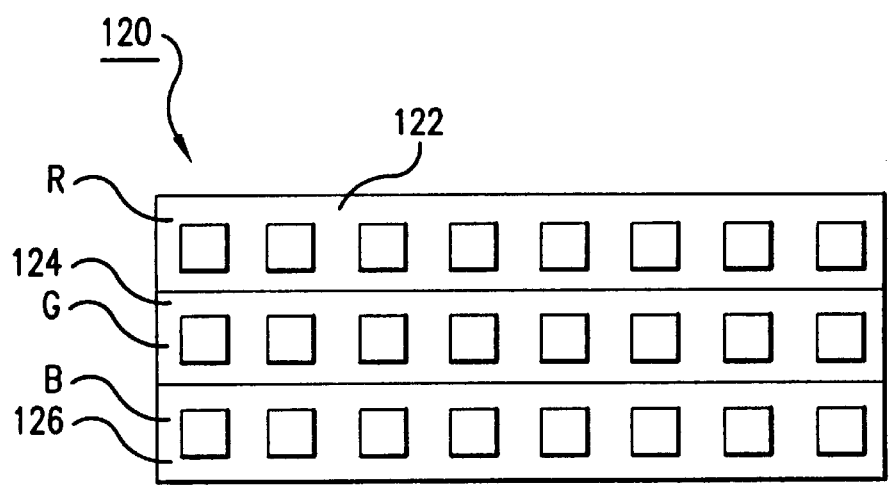
FIG. 2 is a detailed diagram of the CCD of the conventional color scanner of FIG. 1.
Figure 3:
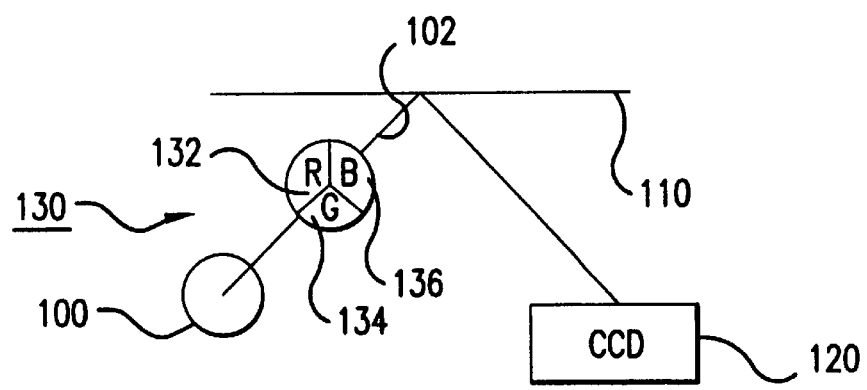
FIG. 3 is a block diagram of a second type of conventional color scanner.
Figure 4:
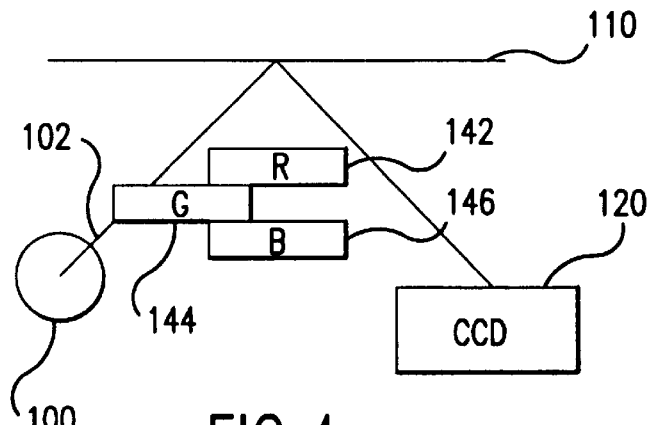
FIG. 4 is a block diagram of a third type of conventional color scanner.
Figure 5:
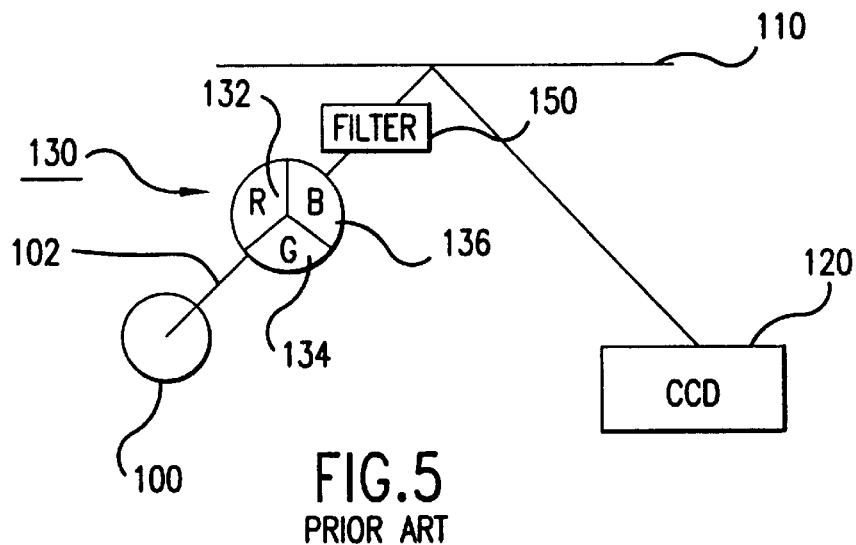
FIG. 5 is a block diagram of a fourth type of conventional color scanner.
Figure 6:
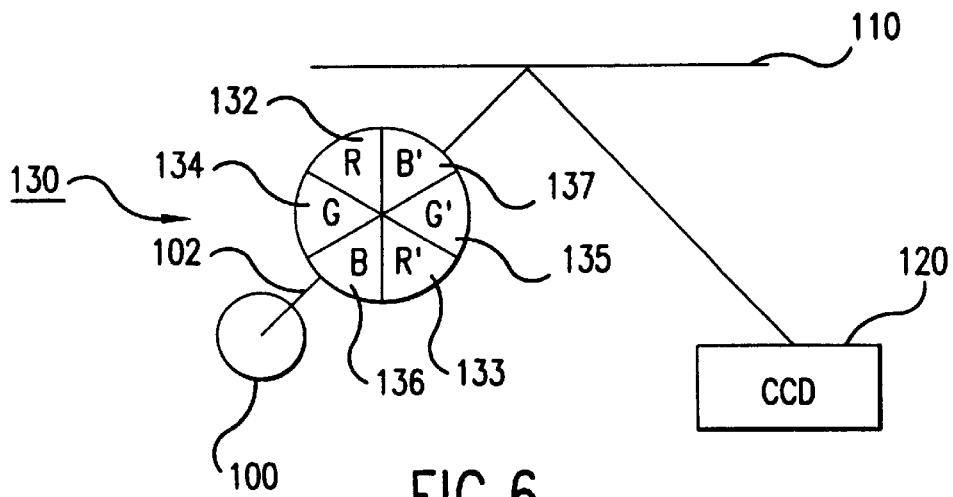
FIG. 6 is a block diagram of a modification of the fourth type of conventional color scanner.
Figure 7:
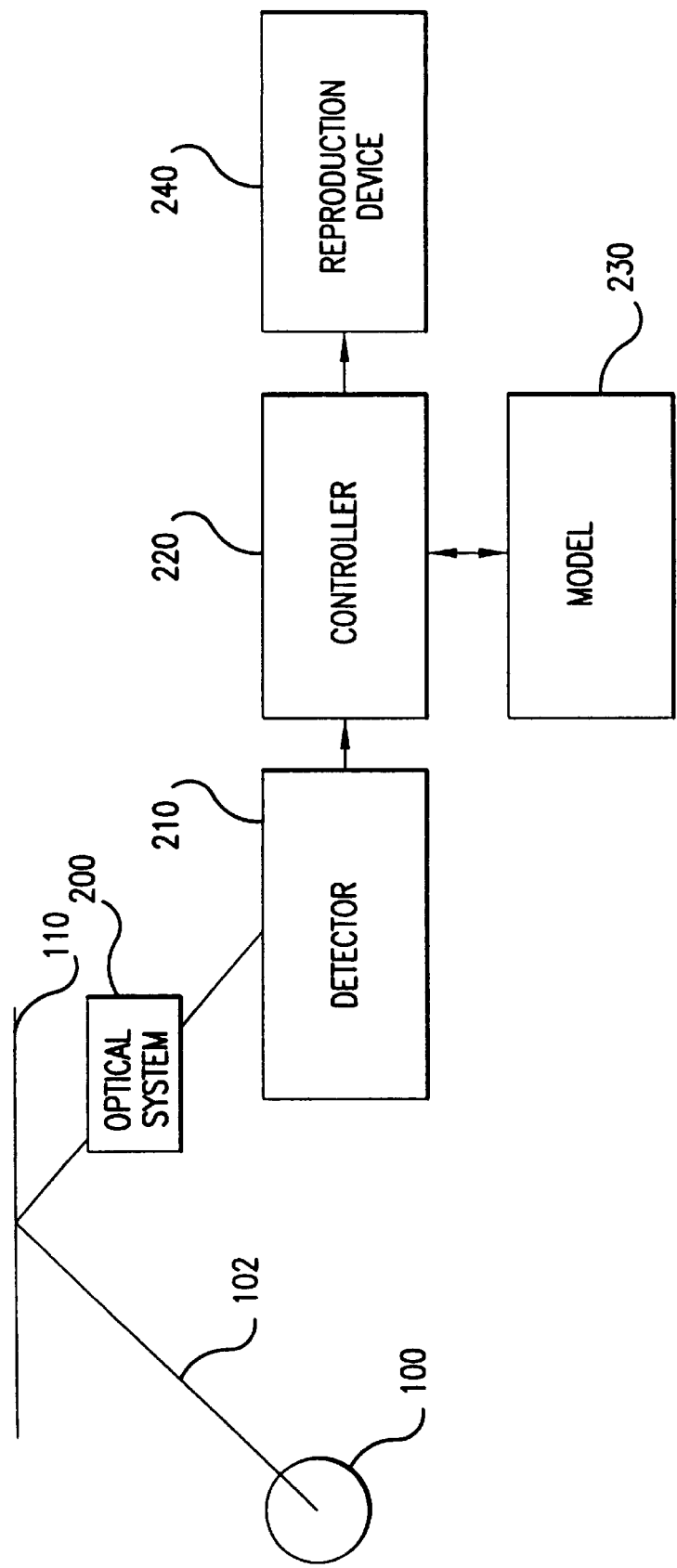
FIG. 7 is a block diagram of the reproduction system of this invention.

FIG. 7 illustrates one embodiment of a scanner according to this invention which uses an additional coating to one cell of the detector. This embodiment will be explained with regard to an image scanner. However, the concepts of this invention may be used with any device that reproduces an article by scanning and detecting color values of a scanned article, such as a color photocopying device, computer or the like.

In this embodiment of the invention, the light source 100 illuminates the image on the medium 110. The light reflected from the image on medium 110 is imaged by an optical system 200 and falls incident on a detector 210 which detects color values from the incident light. The detector 210 may be any device that is capable of detecting color values from incident light, such as a CCD, a full width array (FWA), or the like.

These color values are then provided to a controller 220. The controller 220 provides these values to a model 230 which determines at least one attribute of the image based on the color values detected. The model 230 then provides the at least one attribute to the controller 220, which then performs application specific processing based on the at least one attribute.

In a preferred embodiment, the application specific processing includes determining correction values for correcting the detected color values based on the at least one attribute of the image on the medium 110. The controller 220 obtains these correction values by calculation, a lookup table, or the like and applies them to the detected color values.

The controller 220 then outputs the corrected color values to a reproduction device 240 for use in reproducing the image. The reproduction device 240 may be any device that is used to reproduce a scanned article, such as a printer, a photocopier, a display or the like.

Figure 8:
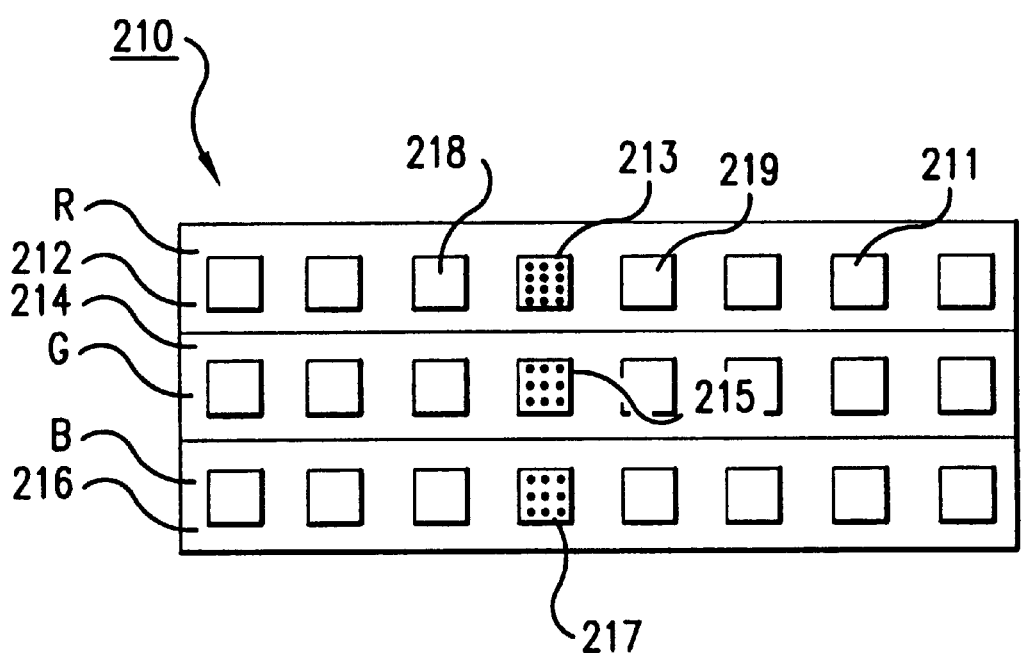
FIG. 8 is a detailed diagram of the detector of FIG. 7.

FIG. 8 shows a detailed diagram of one embodiment of the detector 210. The detector 210 includes three rows 212, 214 and 216 of cells 211. Each row 212, 214 and 216 of the cells 211 detects a different color from the incident light due to red, green and blue filters R, G and B. Thus, the top row of cells 212 of the detector 210 detects red light, the middle row of cells 214 detects green light, and the bottom row of cells 216 detects blue light. Each cell 211 provides color values for the light that falls incident to that cell.

One cell in each row 212, 214 and/or 216, respectively, is a sensor cell 213, 215 and/or 217. Each sensor cell 213, 215 and/or 217 has an additional filtering color applied to it. These additional filtering colors may be applied by applying an additional coating to the sensor cells 213, 215 and 217, by painting the sensor cells 213, 215 and 217, or the like. In general, any method for applying the additional filtering colors to the sensor cells 213, 215 and 217 can be used.

When light falls incident on the sensor cells 213, 215 and/or 217, the color value obtained from these sensor cells will be different from the color value the sensor cells would have detected had the additional filtering colors not been applied to the sensor cells. For example, if the color values that would have been detected by the sensor cells 213, 215 and 217 are R, G and B, the color values actually detected by the sensor cells 213, 215 and 217, respectively, are R', G' and B'.

The values for R, G, B and R', G' and B' output from the normal cells 211 of the rows 212, 214 and 216, and the sensor cells 213, 215 and 217, respectively, of the detector 210 are input to the controller 220. The controller 220 then determines the expected R, G and B values that the sensor cells 213, 215 and 217, respectively, would have detected but for the additional filtering colors.

The color values that the sensor cells 213, 215 and 217 would have detected but for the additional filtering colors can be determined by interpolating the color values obtained from the cells 211 that neighbor each of the sensor cells 213, 215 and 217. For example, the expected color value for the sensor cell 213 in the top row 212 of the detector 210 can be obtained by interpolating the color values of the cells 218 and 219 of the top row 212 adjacent to the sensor cell 213.

The color values R, G, B and R', G' and B' are then input to the model 230. The model 230 can be any model useable to determine at least one attribute of the image from the R, G, B and R', G' and B' values. For example, the model 230 can be an expert system model, a fuzzy logic model, or the like. In a preferred embodiment, the model 230 is a neural network.

Figure 9:
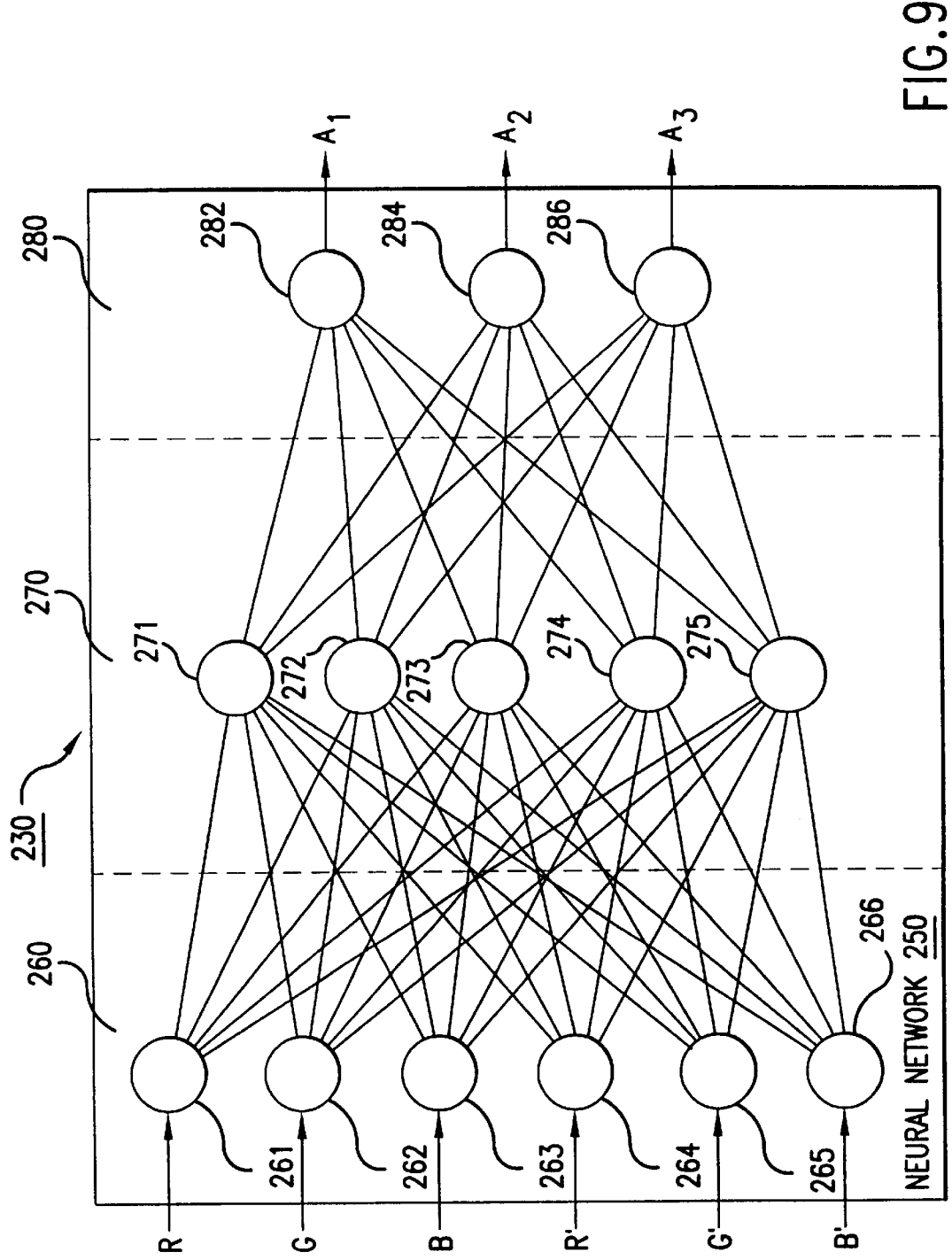
FIG. 9 is a diagram of a neural network of one embodiment of this invention.

FIG. 9 shows the model 230 implemented as a neural network 250 as one embodiment of the attribute identification apparatus according to this invention. The neural network comprises an input layer 260, an intermediate layer 270 and an output layer 280. The input layer has six nodes 261–266 connected respectively to the R, G, B, R', G' and B' outputs from the controller 220. Each of the six nodes 261–266 is connected to each of the five nodes 271–275 of the intermediate layer 270. Each of the five intermediate nodes 271–275 are connected to each of the three output nodes 282, 284 and 286 of the output layer 280. The output nodes 282, 284 and 286 each output a value based on the values received from the intermediate nodes 271–275. The values are input to controller 220 which uses these values to identify at least one attribute of the scanned image. These values, for example, may be binary, alphanumeric, Boolean, or the like.

The neural network 250 is trained using known methods for training a neural network, on known data to obtain the weight for each of the links connecting the input nodes 261–266 to the intermediate nodes 271–275 and the links connecting the nodes 271–275 to the output nodes 282, 284 and 286. Based on these weights, the output nodes 282, 284 and 286 output data $A_1$, $A_2$ and $A_3$ indicative of at least one attribute of the scanned image. For example, the attribute may be the medium on which the image is formed, the type of device that formed the image, and the like.

In a preferred embodiment, the attribute is the medium type on which the image is formed. In this embodiment, the output node 282, 284 or 286 having the maximum output value is selected and a corresponding code that designates the medium is obtained from the selected output node. This same code is stored in a memory (not shown) that is accessible by the controller 220. For example, the code "100" may indicate that the medium is photographic material, the code "010" may indicate a lithographic medium and the code "001" may indicate an inkjet medium. Thus, from the output of the neural network 250, the controller 220 checks the output of the model 230 against the codes stored in memory to determine the medium on which the image is formed.

Based on the determination of the medium, the controller 220 can correct the detected color values for all the cells 211 using predetermined correction coefficients, in order to obtain a true reproduction of the scanned image. These correction coefficients may be calculated using predetermined equations or functions, compiled in one or more correction tables and stored in a memory as look-up tables, or the like.

This same process can be performed for an embodiment in which the attribute obtained from the neural network 250 is the type of device that formed the image. In this embodiment, the codes "100", "010" and "001" designate different image forming devices such as an inkjet printer, laser printer, thermal printer, photocopier, and the like.

As the article is scanned, if it includes more than one color (for example, an image having a blue section and a green section), different color values will be detected by the cells when scanning the different sections of the image. As a result, different values for the attribute may be obtained from the model 230. Thus, when scanning rows in the blue section, it may be determined that the attribute designates a photographic medium. However, when scanning rows in the green section, the attribute may be determined to designate a lithographic medium.

In order to accurately determined the attribute of the scanned article in the above situation, the controller 220 of FIG. 7 may perform statistical analysis on the determined attributes for each scan of the article. This statistical analysis may include averaging the attribute values obtained from the scans, majority rule, and the like. For example, if the article consists of an image having 10 rows (10 scans), the model 230 will provide 10 values for the attribute of the article, each one corresponding to a row of the article. Thus, if scanning the first 7 rows provides 7 determinations that the attribute is photographic material and the remaining scans of rows 8–10 provide a different determination, the majority rule would provide the outcome that the medium is photographic material. In this way, higher accuracy and more robust color correction can be obtained.

Figure 10:
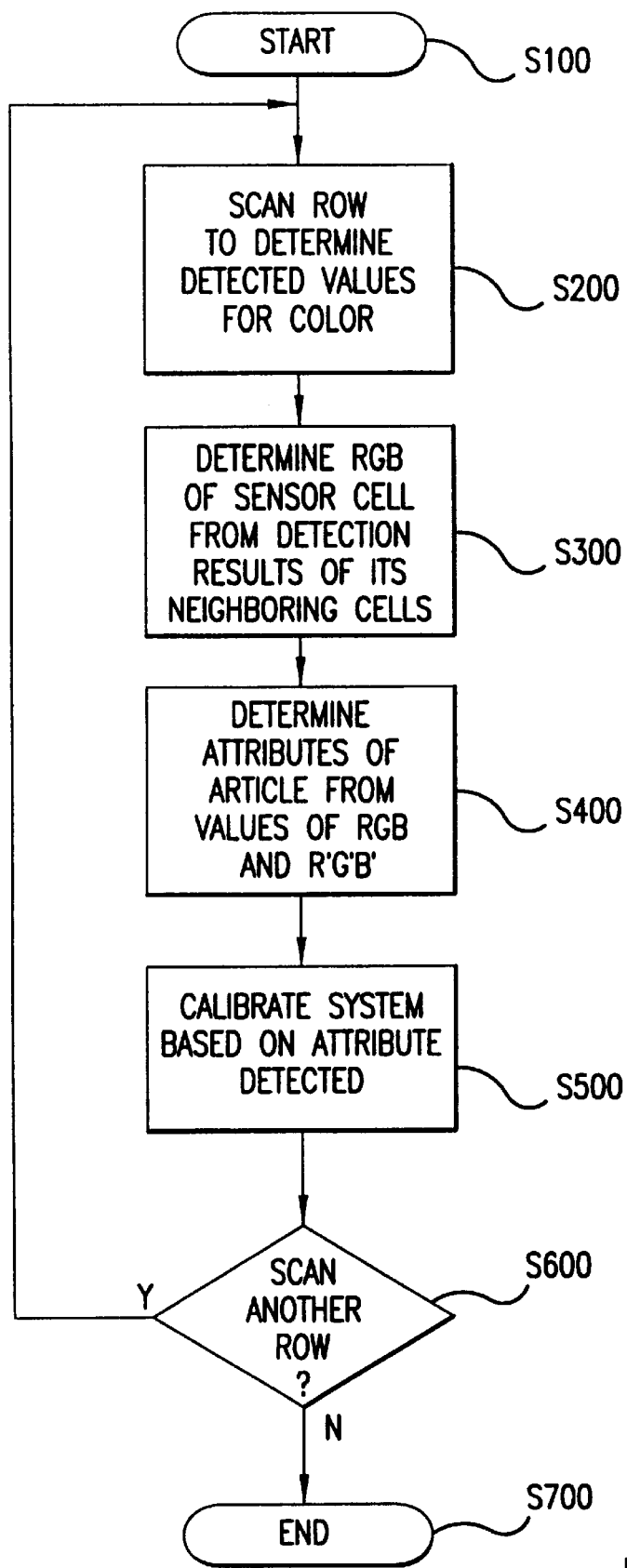
FIG. 10 is a flowchart showing the operation of this invention.

FIG. 10 is a flowchart of the operation of the scanning apparatus described above. The scanning process starts at step S100 and continues to step S200. In step S200, one row of the article is scanned to obtain detected color values from the detector 210. This scan provides the R, G and B color values of the entire row and the R', G' and B' color values for the sensor cells 213, 215 and/or 217 that are input to the controller 220 to determine the correction values. Control then continues to step S300.

In step S300, the color values that the sensor cells 213, 215 and 217 would have detected but for the additional filtering color are determined. This is done for the sensor cell 213, in one embodiment, by interpolating the color values detected by neighboring cells 218 and 219. The corresponding neighboring cells to the sensor cells 215 and 217 in the rows 214 and 216 are similarly used to interpolate the color values for the sensor cells 215 and 217. Control then proceeds to step S400, where the two sets of color values R, G, B and R', G', B' are used to determine at least one attribute of the scanned article. As described above, this attribute may be the medium of the article, the device that formed the article, and the like.

Then, in step S500, correction values for the detected color values are determined based on the attributes determined in step S400. These correction values may be calculated, obtained from a correction table in memory, or the like. These correction values are then used to calibrate the R, G and B values of the entire row provided by the detector 210 so that the color values obtained from all the cells 211 provide a true color representation of the scanned article.

Lastly, in step S600, the process may be repeated for the next row of the scanned article, otherwise, the scanning has finished with the bottom row of the article and the process continues to step S700, where the process ends.

While this invention has been described with reference to a color scanner, the invention is not limited to such an embodiment. The invention may be practiced on any color reproduction device. For example, the invention may be practiced with a color photocopier.

Furthermore, this invention has been described wherein, after the article's attributes are determined, the processing performed is color correction. However, this invention is not limited to such processing. For example, the processing may include determining optimum printhead positioning, determining printer codes, determining paper thicknesses, and the like. Such processing may be facilitated by compiling empirical data with regard to various scanned articles and the corresponding printhead position, printer codes, paper thicknesses, etc. that provide the optimum result in reproducing the scanned article. This information may be contained in the memory described above and accessed based on the attribute codes output by the model 230.

Additionally, this invention is not intended to be limited to the particular colors described above. While the preferred embodiment uses red, green and blue scanning colors, these colors may be replaced by other colors depending on the particular application. Thus, any combination of colors may be used without departing from the spirit and scope of this invention.

Furthermore, this invention has been described with reference to a single detector having three rows of cells to detect the three colors, red, green and blue. However, this invention is not limited to such an arrangement. The detector may have more or fewer rows of cells for detection of the color values of the article. Moreover, additional detectors may be used, each detecting only one color from the article.

Also, more than one set of sensor cells may be used in one row. Thus, it is possible to increase the detection accuracy and/or to detect cases when different attributes occur side-by-side on one page. For example, if a page includes an image printed by a laser printer and text printed by a bubble jet printer, the additional sensor cells would provide additional detection accuracy of the differing attributes.

Further, this invention may employ an additional detector or additional row of cells having the additional filtering color applied rather than applying the filtering color to the sensor cells 213, 215 and/or 217. The apparatus continues to operate as described above, only the R', G' and B' values would be obtained from the additional detector or row of cells.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative and not limiting. Various changes may be made without departing from the spirit and scope of the invention as defined in the following claims.

What is claimed is:

1. An apparatus for determining an attribute of an article, comprising:

a light source that illuminates the article;

at least one detector having at least one row of cells with at least one filtering color applied to the cells, wherein each row has at least one sensor cell, the at least one sensor cell having an additional filtering color applied to the at least one sensor cell in addition to the at least one filtering color, and wherein the cells and the at least one sensor cell output color values detected from light reflected from the article; and a controller that determines at least one attribute of the article from the color values of the cells and the at least one sensor cell.

2. The apparatus of claim 1, wherein the controller determines color values for the sensor cells that would have been detected but for the additional filtering color.

3. The apparatus of claim 2, further comprising a model that outputs an identification code that identifies the at least one attribute of the article based on the color values detected by the sensor cells and the color values that the sensor cells would have detected but for the additional filtering color.

4. The apparatus of claim 3, wherein the model is one of a neural network model, an expert system model and a fuzzy logic model.

5. The apparatus of claim 3, wherein the controller determines at least one attribute of the article from the values of the cells and sensor cells using one of averaging the identification code with previously output identification codes and determining majority rule of the identification code with previously output identification codes.

6. The apparatus of claim 2, wherein the controller determines the color values of the sensor cells that would have been detected but for the additional filtering color by interpolating the color values of cells neighboring the sensor cells.

7. The apparatus of claim 1, wherein the controller determines color correction values based on the at least one attribute.

8. The apparatus of claim 1, wherein the at least one attribute is at least one of a medium of the article and a device that formed the article.

9. The apparatus of claim 1, further comprising an article reproduction device that reproduces the article based on the determined at least one attribute.

10. The apparatus of claim 9, wherein the article reproduction device includes one of a printer, a photocopier, and a display.

11. An apparatus for determining an attribute of an article, comprising:

a light source that illuminates the article;

a first detector having at least one row of first cells with at least one filtering color applied to the first cells;

a second detector having at least one row of second cells having an additional filtering color applied to the second cells, the additional filtering color being in addition to the at least one filtering color, wherein the first cells and the second cells output color values detected from light reflected from the article; and a controller that determines at least one attribute of the article from the output of the first cells and the second cells.

12. The apparatus of claim 11, wherein the controller determines color values of the sensor cells that would have been detected but for the additional filtering color.

13. The apparatus of claim 12, further comprising a model that outputs an identification code that identifies the at least one attribute of the article based on the color values detected by the sensor cells and the color values that the sensor cells would have detected but for the additional filtering color.

14. The apparatus of claim 11, wherein the at least one attribute is at least one of a medium of the article and a device that formed the article.

15. The apparatus of claim 11, further comprising an article reproduction device that reproduces the article based on the determined at least one attribute.

16. The apparatus of claim 15, wherein the article reproduction device includes one of a printer, a photocopier, and a display.

17. A method of correcting color values based on a detected attribute of an article, comprising:

illuminating the article;

detecting color values from light reflected from the article, wherein the color values include color values detected by one or more first detectors having at least one first filtering color applied to the one or more first detectors and offset color values detected by one or more second detectors having at least one first filtering color and at least one additional filtering color applied to the one or more second detectors;

determining at least one attribute of the article based on the detected color values;

determining correction values for the color values detected based on the at least one determined attribute; and correcting the color values in accordance with the determined correction values.

18. The method of claim 17, wherein the at least one attribute of the article is determined by inputting the detected color values into a model.

19. The method of claim 18, wherein the model is one of a neural network model, an expert system model and a fuzzy logic model.

20. The method of claim 17, wherein the at least one attribute is at least one of a medium of the article and a device that formed the article.

21. The method of claim 17, further comprising reproducing the article based on the corrected color values.

22. A method of determining at least one attribute of an article, comprising:

illuminating the article;

detecting color values from light reflected from the article, wherein the color values include color values detected by one or more first detectors having at least one first filtering color applied to the one or more first detectors and offset color values detected by one or more second detectors having at least one first filtering color and at least one additional filtering color applied to the one or more second detectors;

inputting the detected color values into a model; and determining at least one attribute of the article based on the detected color values.

23. The method of claim 22, wherein the model is one of a neural network model, an expert system model and a fuzzy logic model.

24. The method of claim 22, wherein the at least one attribute is at least one of a medium of the article and a device that formed the article.

25. The method of claim 22, wherein determining at least one attribute includes one of averaging the output of the model with previous outputs of the model and determining the majority rule of the output of the model with previous outputs of the model.

* * * * *